United States Patent Office 3,138,576
Patented June 23, 1964

3,138,576
PROCESS FOR THE ANIONIC POLYMERIZATION OF CAPROLACTAM WITH BENZIMIDO COMPOUNDS AS ACTIVATORS
Burton Carl Anderson and Melvin Ira Kohan, Graylyn Crest, Del., assignors to E. I. du Pont de Nemours and Company, Wilmington, Del., a corporation of Delaware
No Drawing. Filed Sept. 15, 1961, Ser. No. 138,302
12 Claims. (Cl. 260—78)

The present invention relates to an improved process for the anionic polymerization of lactams and, more particularly, to a process for the rapid anionic polymerization of ω-lactams wherein new co-catalysts are used to achieve high polymerization rates and fast polymer set-up times at temperatures well below the polyamide melting point.

Polymerization of an important member of the class of ω-lactams, ε-caprolactam (hereafter called simply caprolactam), to the polycarboxamide, 6-nylon, has been known for several decades. In the early caprolactam polymerizations, acidic materials and small amounts of water were used as catalysts, and long polymerization times, i.e., of the order of hours or even days, were required. Later, the polymerization of caprolactam was found to occur relatively more rapidly when basic materials, particularly the alkali and alkaline-earth metals, or their compounds, were present and the polymerization system was substantially anhydrous. These base-promoted or anionic polymerizations require temperatures in excess of 200° C. Since these applied temperatures approach or even exceed the polycaprolactam melting point and since the polymerization reaction is moderately exothermic, liquid (molten) polyamide is present during at least part of the anionic polymerization.

Exceeding the melting point of the product polyamide during the polymerization is disadvantageous, particularly when the lactam is polymerized in situ to form a shaped article, coating, or the like. For example, when the high-temperature anionic polymerization procedure is used in casting or molding operations, it is necessary to cool the molds appreciably before the molten or semimolten articles solidify to an extent such that they can safely be removed. Molding and casting cycles of economically unattractive lengths thus are required. In addition, the high peak temperatures and the wide temperature ranges through which the shaped articles or coatings are cycled often lead to shrinkage voids and other faults in the finished, cooled polymer.

Primarily because of these and other disadvantages inherent in the anionic polymerization of ω-lactams, a variety of co-catalysts derived from inorganic and organic acids have been evaluated in the polymerization in recent years. However, not all the co-catalysts tested heretofore have been entirely satisfactory with respect to one or more of such factors as basic cost and effectiveness in low concentrations; required polymerization temperatures and times; conversions of lactam to polyamide; and polymer molecular weights achieved. Hence the need for new, improved co-catalysts for the anionic polymerization of ω-lactams has continued.

In accord with the present invention, we have found that the use of a small amount of a new class of co-catalyst, substituted benzimido compounds, promotes rapid conversion of ω-lactams to solid polycarboxamides at temperatures between the fusion point of the lactam and the melting point of the polyamide product involved.

The benzimido compounds effective as co-catalysts in the anionic polymerization of the lactams are characterizable by the structural formula:

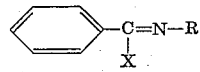

where R signifies an organic radical, particularly a cyclic or acyclic hydrocarbon radical, and X is halogen or is an —OR' group wherein R' is an acyclic or cyclic hydrocarbon radical, R and R' being the same or different. Representative members of this class are benzimido halides substituted on the imido nitrogen by a hydrocarbon radical, such as N-phenylbenzimido chloride and N-methylbenzimido chloride:

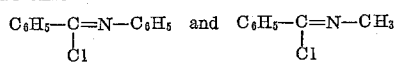

as well as the corresponding ethers, e.g., phenyl N-phenylbenzimido ether:

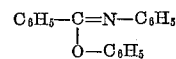

These benzimido compounds are effective co-catalysts or promoters in the anionic polymerization in amounts of 1 mole percent or less, based on the lactam.

In carrying out the process of the invention with, for example, caprolactam, the caprolactam, which is substantially anhydrous, i.e., contains less than 0.1% water, first is heated to a temperature above its melting point (68–69° C.) but below about 225° C. with a small amount of a base to produce the anionic catalyst therein. All or a portion of the caprolactam to be polymerized may be present in this reaction. Suitable bases are those which are sufficiently strong to react with caprolactam to form an iminium salt of the lactam, which may be represented simply as:

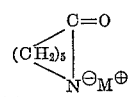

where M signifies a cation, particularly a metal cation. Such bases include the alkali metals, e.g., sodium potassium, or lithium, the alkaline-earth metals, e.g., magnesium, calcium, strontium, or barium, and compounds of these metals, such as the hydrides, oxides, hydroxides, alkoxides, amides, borohydrides, alkyls, aryls, and the like. The amount of the base may vary from about 0.1 to 10 mole percent of the lactam, a base concentration within the range of 0.2 to 5 mole percent generally being preferred.

The time required to prepare the anionic catalyst may vary from a few minutes to several hours, depending on such variables as the type (strength) of the base used, the base concentration, and the reaction temperature. Reaction times up to 2 hours, particularly within the range of 10 to 120 minutes, are generally suitable.

To remove any low-molecular-weight material and also to prevent oxidation, it is desirable to bubble nitrogen or another nonreactive gas through the ω-lactam melt during preparation of the anionic catalyst. Alternatively, the reaction of the lactam with the base may be conducted under reduced pressure and low-molecular-weight material removed, together with some lactam, by distillation.

Following the preparation of the anionic catalyst, the benzimido compound co-catalyst, optionally mixed with additional ω-lactam free of anionic catalyst, is added to the lactam containing the anionic catalyst, and the resulting mixture is heated to and maintained at a temperature between the fusion point of the lactam and the melting point of the polycarboxamide product. Thus, in effecting polymerization of caprolactam to solid polycaprolactam, a polymerization temperature range of from 100 to 200° C., preferably from 140 to 180° C., is suitable. Conversion of the ω-lactams to the polycarboxamides is rapid at these temperatures when the benzimido compound co-catalyst is used in amounts of 0.1 to 2 mole percent of the total lactam, preferably in amounts of 0.2 to 1 mole percent.

The following examples illustrate two modes of effecting the anionic polymerization of a representative ω-lactam, caprolactam, in the presence of benzimido compounds as co-catalysts. However, the present invention should not be construed as limited to the exact reactants and procedures shown therein, since obvious modifications will occur to those skilled in the polymer arts.

EXAMPLE 1

To prepare caprolactam containing an anionic catalyst, a mixture of 16 grams of caprolactam containing less than 0.05% water and 0.065 gram (0.85 mole percent) of sodium methoxide was charged to a glass test tube, and the tube was placed in a constant-temperature bath at 150° C. Nitrogen was bubbled through the molten mass at a rate of 350 cc. per minute. After 20 minutes at 150° C., during which no polymerization occurred, 0.060 gram (0.2 mole percent) of N-phenylbenzimido chloride was introduced into the anionic catalyst-containing caprolactam melt as a co-catalyst. Following this addition, the bubbling of nitrogen through the melt was continued for approximately 30 seconds, and then the nitrogen inlet tube was raised to allow the gas to pass over the melt. The tube containing the homogeneous, bubble-free melt was maintained in the constant-temperature bath at 150° C., and the polymerizing mass was observed continuously after the addition of the co-catalyst. In 24.5 minutes, the mass became sufficiently viscous that the meniscus remained undisturbed when the test tube was rotated through an angle of approximately 45°. The first turbidity, indicating the occurrence of crystallization, was seen 26 minutes after the addition of the co-catalyst, and solidification or setup of the polymerizing mass to a point where no further change could be observed in the appearance of the surface of the mass occurred 29 minutes after the addition. The tube was removed from the bath 31.5 minutes after the co-catalyst addition, dried, cooled to room temperature, and the polymer removed for evaluation. The relative viscosity of the polymer, determined by preparing a solution of 0.42 weight percent of the polymer in 90% formic acid at 25.0° C., was found to be 7.7. The amount of low-molecular-weight material in the polymer was determined by extracting 5 grams of 20-mesh polymer granules with 60 ml. of boiling water for 24 hours. The extractable material by this method constituted 5.7 weight percent of the total polymer product.

Anionic polymerization of caprolactam does not occur under the foregoing conditions without the co-catalyst component. A comparative experiment was conducted in which the above-described procedure was repeated except for the omission of the benzimido compound co-catalyst. Essentially no polymerization occurred after the reaction mixture had been in the constant-temperature bath at 150° C. for 8 hours.

In preparing the anionic catalyst, sodium hydroxide or potassium hydroxide, among other bases, may be used in place of the aforementioned sodium methoxide. For example, anionic catalyst has been prepared by adding 1 mole percent of sodium hydroxide or potassium hydroxide to substantially anhydrous caprolactam and bubbling nitrogen through the resulting mixture at a rate of 5000 cc. per minute per pound of lactam while heating for 1 hour at 100° C. in the case of the sodium hydroxide and at 86° C. in the case of the potassium hydroxide.

EXAMPLES 2–4

The procedure in the runs of these examples (Table I) was the same as that of Example 1, except that the concentrations of sodium methoxide, the amounts of the N-phenylbenzimido chloride co-catalyst, and the temperature of the constant-temperature bath were those specified in the table.

In Table I, "no-flow" time refers to the period following addition of the co-catalyst required for the polymerizing mass to become sufficiently viscous that the meniscus remained undisturbed when the test tube was tilted through an angle of about 45°. Crystallization time refers to the period needed for the first turbidity to appear in the mass; set-up time refers to the period of time after which no further change could be observed in the appearance of the surface of the polymer mass; and total time signifies the entire period during which the polymerizing mass was in the constant-temperature bath following addition of the co-catalyst. $\eta_r$ refers to relative viscosity and percent E to percent water extractables, both determined as outlined in Example 1.

*Table I*

ANIONIC POLYMERIZATION OF CAPROLACTAM—DIRECT ADDITION OF BENZIMIDO COMPOUND CO-CATALYST TO CAPROLACTAM CONTAINING ANIONIC CATALYST

| Example No. | NaOCH₃ Concn. (mole percent) | N-Phenyl-benzimido Chloride Co-catalyst Concn. (mole percent) | Bath Temp. (° C.) | "No-flow" Time (min.) | Crystn. Time (min.) | Set-up Time (min.) | Total Time (min.) | $\eta_r$ | Percent |
|---|---|---|---|---|---|---|---|---|---|
| 2 | 1.5 | 0.5 | 150 | 12 | 13.5 | 15 | 16.75 | 3.4 | 5.4 |
| 3 | 1.5 | 0.5 | 175 | 3 | 6 | 9.5 | 14.5 | 3.0 | 5.6 |
| 4 | 3.0 | 1.0 | 150 | 4.5 | 5.0 | 6.5 | 9.5 | 2.4 | 5.4 |

EXAMPLES 5–7

In Examples 5 to 7 (Table II), the general procedure of Example 1 was followed except that only one-half the caprolactam to be polymerized (8 grams) was present during the reaction with the sodium methoxide to prepare the anionic catalyst. Into the anionic catalyst-containing lactam melt then was introduced an additional 8 grams of caprolactam, which had been mixed with the indicated type and amount of benzimido compound co-catalyst by preheating for 20 minutes at 150 or 175° C. In the case of pretreatment at 175° C., the co-catalyst-lactam mixture was heated for an additional 20 minutes at 150° C., for thermal equilibration, prior to addition to the lactam melt containing the anionic catalyst. The results are recorded in Table II, where the headings have essentially the same meanings as those of Table I. In Table II, "preheat temperature" refers to the temperature at which the second half of the lactam and the co-catalyst were treated prior to addition to the lactam containing the anionic catalyst. The recorded concentrations of the sodium methoxide (1.5 mole percent in all cases) and of the benzimido compounds are based on the total caprolactam, and the time of addition of the mixture of lactam and co-catalyst is considered "zero time" in recording the "no-flow," crystallization, set-up, and total times for each run.

Table II
ANIONIC POLYMERIZATION OF CAPROLACTAM—ADDITION OF PREMIXED CAPROLACTAM-BENZIMIDO COMPOUND CO-CATALYST STREAM TO CAPROLACTAM CONTAINING ANIONIC CATALYST
[1.5 mole percent NaOCH₃; 150° C. Bath Temperature]

| Example No. | Co-catalyst | | Preheat Temp. (° C.) | "No-flow" Time (min.) | Crystn. Time (min.) | Set-up Time (min.) | Total Time (min.) | $\eta_r$ | Percent E |
|---|---|---|---|---|---|---|---|---|---|
| | Compound | Concn. (mole percent) | | | | | | | |
| 5 | N-Phenylbenzimido chloride | 0.5 | 150 | 5 | 5.75 | 6.75 | 7.75 | 2.3 | 5.3 |
| 6 | N-Methylbenzimido chloride | 0.5 | 150 | 4.75 | 5.5 | 6.75 | 9 | 2.3 | 46.1 |
| 7 | Phenyl N-phenylbenzimido ether | 0.2 | 175 | 15 | 16.5 | 19 | 20 | 5.6 | 8.5 |

The quality of the ω-lactam polymers is assessable not only in terms of such properties as molecular weight and content of low-molecular-weight materials but also in terms of physical properties indicative of commercial usefulness. The process of this invention gives, e.g., solid polycaprolactam, which is tough and impact resistant and hence is suitable as articles of hardware, such as protective housings for electrical and electronic fixtures and components, and in like applications. The particular advantages of the present process are most readily apparent when the ω-lactam is polymerized in situ to form filled or unfilled shaped articles or coatings and polymer-impregnated fibrous webs.

The process of the invention and its advantages have been described in detail in the foregoing. However, many variations within the spirit and scope of the invention will be apparent to those skilled in the art. For example, ε-caprolactam has been used to demonstrate the present process, but it will be obvious that rapid anionic polymerizations of lactams of other ω-amino alkanoic acids can also be achieved by conducting the polymerizations in the presence of the benzimido compound co-catalysts at temperatures between the melting point of the lactam monomer and the fusion temperature of the polycarboxamide product. Depending upon the lactam chosen, these polymerization temperatures will generally fall within the range of 25 to 200° C.

We claim:
1. A process for the rapid polymerization of a substantially anhydrous ω-lactam to a solid polyamide which comprises mixing the lactam with an anionic catalyst consisting of an iminium salt of an ω-lactam and a co-catalyst consisting of a benzimido compound of the formula:

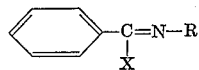

wherein R is a hydrocarbon radical and X is a member selected from the group consisting of halogen radicals and —O—R′ groups in which R′ is a hydrocarbon radical, and thereafter heating the mixture at a temperature between the fusion point of the lactam and the melting point of the resulting polyamide until the polyamide solidifies.

2. A process for the rapid polymerization of substantially anhydrous caprolactam to solid polycaprolactam which comprises mixing caprolactam with an anionic catalyst consisting of a caprolactiminium salt and a co-catalyst consisting of a benzimido compound of the formula:

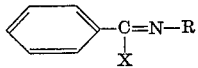

wherein R is a hydrocarbon radical and X is a member selected from the group consisting of halogen radicals and —O—R′ groups in which R′ is a hydrocarbon radical, and thereafter heating the mixture at a temperature of from 100 to 200° C. until the resulting polycaprolactam solidifies.

3. The process as claimed in claim 2, wherein the benzimido compound is N-phenylbenzimido chloride.

4. The process as claimed in claim 2, wherein the benzimido compound is N-methylbenzimido chloride.

5. The process as claimed in claim 2, wherein the benzimido compound is phenyl N-phenylbenzimido ether.

6. A process for preparing solid polycaprolactam from caprolactam which comprises reacting substantially anhydrous caprolactam at a temperature above its melting point and below 225° C. with a base selected from the group consisting of alkali metals, alkaline earth metals, and the hydrides, oxides, hydroxides, alkoxides, amides, borohydrides, alkyls, and aryls of said metals to produce a caprolactiminium salt as anionic catalyst therein; adding to the caprolactam containing the said anionic catalyst a co-catalyst consisting of a benzimido compound of the formula:

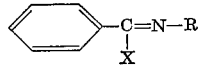

wherein R is a hydrocarbon radical and X is a member selected from the group consisting of halogen radicals and —O—R′ groups in which R′ signifies a hydrocarbon radical; and thereafter heating the resulting mixture to a temperature of from 100 to 200° C. to effect polymerization thereof.

7. The process as claimed in claim 6, wherein an inert gas is passed through the molten caprolactam during the reaction with base to produce an anionic catalyst therein.

8. The process as claimed in claim 6, wherein the base is an alkali metal.

9. The process as claimed in claim 6, wherein the base is sodium methoxide.

10. The process as claimed in claim 6, wherein the base is potassium hydroxide.

11. The process as claimed in claim 6, wherein the benzimido compound co-catalyst added to the caprolactam containing anionic catalyst is added as a mixture with caprolactam free of anionic catalyst.

12. A process for preparing solid polycaprolactam from caprolactam which comprises heating substantially anhydrous caprolactam at a temperature above its melting point and below 225° C. with from 0.1 to 10 mole percent of a base selected from the group consisting of alkali metals and the hydrides, oxides, hydroxides, alkoxides, amides, borohydrides, alkyls, and aryls of the alkali metals to produce a caprolactiminium salt as anionic catalyst therein; adding to the caprolactam containing the said anionic catalyst from 0.1 to about 2 mole percent, based on the caprolactam, of a co-catalyst consisting of a benzimido compound of the formula:

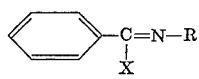

wherein R is a hydrocarbon radical and X is a member selected from the group consisting of halogens and —O—R' groups in which R' is a hydrocarbon radical; and thereafter heating the resulting mixture to a temperature of from 100 to 200° C. to effect polymerization thereof.

References Cited in the file of this patent

UNITED STATES PATENTS

| | | |
|---|---|---|
| 2,356,622 | Schlack | Aug. 22, 1944 |
| 2,767,182 | Konz | Oct. 16, 1956 |
| 3,015,652 | Schnell et al. | Jan. 2, 1962 |

UNITED STATES PATENT OFFICE
CERTIFICATE OF CORRECTION

Patent No. 3,138,576　　　　　　　　　　　　June 23, 1964

Burton Carl Anderson et al.

It is hereby certified that error appears in the above numbered patent requiring correction and that the said Letters Patent should read as corrected below.

Column 4, Table I, heading to the last column, for "Percent" read -- Percent E --; columns 5 and 6, Table II, last column, under "Percent E", second line thereof, for "46.1" read -- 6.1 --.

Signed and sealed this 29th day of December 1964.

(SEAL)
Attest:

ERNEST W. SWIDER
Attesting Officer

EDWARD J. BRENNER
Commissioner of Patents